US009086022B2

(12) United States Patent
Shimizu et al.

(10) Patent No.: US 9,086,022 B2
(45) Date of Patent: Jul. 21, 2015

(54) GAS ENGINE

(75) Inventors: Yuuichi Shimizu, Tokyo (JP); Hajime Suzuki, Tokyo (JP); Hideki Nishio, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 100 days.

(21) Appl. No.: 13/695,562

(22) PCT Filed: May 18, 2011

(86) PCT No.: PCT/JP2011/061455
§ 371 (c)(1),
(2), (4) Date: Oct. 31, 2012

(87) PCT Pub. No.: WO2011/152218
PCT Pub. Date: Dec. 8, 2011

(65) Prior Publication Data
US 2013/0055712 A1   Mar. 7, 2013

(30) Foreign Application Priority Data
May 31, 2010  (JP) .................................. 2010-124052

(51) Int. Cl.
F02D 23/00       (2006.01)
F02B 33/44       (2006.01)
(Continued)

(52) U.S. Cl.
CPC ............ *F02D 29/06* (2013.01); *F02B 19/1004* (2013.01); *F02D 19/023* (2013.01);
(Continued)

(58) Field of Classification Search
CPC ..... F02D 19/027; F02D 19/029; F02D 19/10; F02D 19/023; F02D 19/0623; F02D 29/06; F02D 41/0007; F02D 2041/389; F02M 21/0215; F02M 69/045; F02M 69/34; F02M 21/078; G06Q 40/04; Y04S 4/10; Y02T 10/32; F02B 1/04; F02B 1/12; F02B 37/00; F02B 37/12; F02B 37/183; F02C 6/12
USPC ......... 60/599, 605.1, 601, 602; 123/1 A, 294, 123/299; 701/104
See application file for complete search history.

(56) References Cited

U.S. PATENT DOCUMENTS 6,033,207 A    3/2000  Cummings
7,801,668 B2 *  9/2010  Ito et al. ...................... 701/108
(Continued)

FOREIGN PATENT DOCUMENTS

CN    1170456    1/1998
CN    1831318    9/2006
(Continued)

OTHER PUBLICATIONS

International Preliminary Report on Patentability and Written Opinion of the International Searching Authority issued Jan. 8, 2013 in corresponding International Application No. PCT/JP2011/061455 (with English translation).
(Continued)

*Primary Examiner* — Thai Ba Trieu
*Assistant Examiner* — Jason T Newton
(74) *Attorney, Agent, or Firm* — Wenderoth, Lind & Ponack, L.L.P.

(57) ABSTRACT

A gas engine includes a generator coupled to an output shaft thereof, an intake passage to which a low-concentration methane gas (VAM gas) derived from mine venting is supplied, and a gas mixing unit mixing a high-concentration methane gas (CMM gas) to the low-concentration methane gas midway along the intake passage, so that a gas mixture of the low-concentration methane gas and the high-concentration methane gas is supplied to and burnt in a combustion chamber. A turbocharger is provided in the intake passage upstream of the gas mixing unit, and in the intake passage upstream of the turbocharger, is provided a mixture ratio adjusting unit adjusting a mixture ratio of the low-concentration methane gas and the air. The temperature or flow rate of intake gas flowing into the turbocharger is kept in a constant range by an intake controller.

12 Claims, 7 Drawing Sheets

(51) Int. Cl.
| | |
|---|---|
| F02B 43/00 | (2006.01) |
| F02D 29/06 | (2006.01) |
| F02B 19/10 | (2006.01) |
| F02M 21/02 | (2006.01) |
| F02D 19/02 | (2006.01) |
| F02D 19/10 | (2006.01) |

(52) U.S. Cl.
CPC .............. *F02D19/027* (2013.01); *F02D 19/10* (2013.01); *F02M 21/0215* (2013.01); *F02D 19/025* (2013.01); *Y02T 10/125* (2013.01); *Y02T 10/32* (2013.01); *Y02T 10/36* (2013.01)

(56) References Cited

U.S. PATENT DOCUMENTS

| | | | |
|---|---|---|---|
| 8,347,861 B2* | 1/2013 | Shimizu et al. | 123/445 |
| 8,485,158 B2* | 7/2013 | Nishio et al. | 123/528 |
| 2005/0205022 A1* | 9/2005 | Ito et al. | 123/27 GE |
| 2006/0204909 A1* | 9/2006 | Malm | 431/12 |
| 2008/0147303 A1* | 6/2008 | Ito et al. | 701/111 |
| 2008/0162335 A1* | 7/2008 | Ito et al. | 705/37 |
| 2009/0321243 A1* | 12/2009 | Bose | 203/49 |
| 2012/0000435 A1* | 1/2012 | Scotto | 123/3 |
| 2013/0101401 A1* | 4/2013 | Shimizu et al. | 415/175 |
| 2013/0220278 A1* | 8/2013 | Nishio et al. | 123/478 |
| 2013/0276433 A1* | 10/2013 | Yamasaki et al. | 60/286 |

FOREIGN PATENT DOCUMENTS

| | | |
|---|---|---|
| JP | 10-508683 | 8/1998 |
| JP | 2006-249954 | 9/2006 |
| JP | 2010-19247 | 1/2010 |
| WO | 2006/094391 | 9/2006 |
| WO | 2008/079156 | 7/2008 |

OTHER PUBLICATIONS

International Search Report issued Jun. 21, 2011 in corresponding International Application No. PCT/JP2011/061455.
"AES China Announces Partnership to Develop Carbon Reduction Project, Inaugural Project to Install First Commercial Coal Mine VAM Project in Chongqing" Newsroom, AES China in the News, published on Nov. 17, 2009.
"VAM Power Plant", published on Sep. 14, 2007.
"U.S. to Test New Coal Mine Methane Venting Technology—System Can Turn Problem into Asset", published on May 23, 2007 (with English translation).
Decision to Grant a Patent issued Jun. 4, 2013 in corresponding Japanese Application No. 2010-124052 (with English translation).
Machine translation of Japanese Patent Application Publication No. 2010-19247, published Jan. 28, 2010.
Decision for Grant of Patent issued Mar. 13, 2014 in corresponding Korean Application No. 10-2012-7025920 (with English translation).
Office Action issued Oct. 8, 2014 in corresponding Chinese Patent Application No. 201180021954.5 with English Translation.

* cited by examiner

GAS ENGINE

TECHNICAL FIELD

The present invention relates to a gas engine that makes effective use of natural gas, biogas, or methane gas emitted from a coal mine or the like as intake gas or fuel.

BACKGROUND ART

The world's interest in restrictions on emissions of green house gases such as methane ($CH_4$) and $CO_2$ has been increasing over the years. Methane, in particular, is 21 times more potent than $CO_2$ in driving the global warming, and therefore methane emissions to atmosphere must not be left unnoticed. In the meantime, a large amount of methane, as much as 10 to 40 $Nm^3$ (pure methane) per ton of coal, is being released during coal mining from a coal mine.

Coal mines emit two types of methane gas: CMM (Coal Mine Methane) gas (with a concentration of about 20 to 50 wt %) existing in and recovered from coal seams through degassing bore holes using vacuum pumps for safety reasons, and VAM (Ventilation Air Methane) gas (with a concentration of less than 1 wt %) released through venting from the mine tunnels and the coal face.

Therefore, effective use of the methane contained in the gases emitted from coal mines by capturing it before it is released to atmosphere will make significant economic and social contributions.

Patent Document 1 discloses a gas turbine capable of making use of gases with a methane concentration of below the explosion limit, such as landfill gas produced in the landfill, or the gases emitted from coal mines as noted above, as fuel.

Patent Document 2 discloses a gas engine for power generation using methane gas emitted from a coal mine as fuel. The gas engine power generating facility disclosed in Patent Document 2 will be described below with reference to FIG. 7. FIG. 7 is a schematic illustration of a coal mine CM and a gas engine power generating facility 200 built near the coal mine CM. In FIG. 7, inside the coal mine CM are layers of coal seams $C_0$ and the coal seam being mined $C_1$. A ventilation hole 206 is provided for communicating the inside of the coal mine with the outside.

In the coal face 204 of the coal mine, degassing bore holes 208 are drilled in the coal seam being mined $C_1$, and CMM gas emitted from the bore holes 208 is sent to the gas engine power generating facility 200 through a pipe 210 disposed inside the ventilation hole 206 by means of a vacuum pump 211. VAM gas b emitted from the coal mine through the ventilation hole 206 is sent to the gas engine power generating facility 200 through a pipe 212. Electric power E and steam S generated through operation of the gas engine power generating facility 200 are sent to a utility facility 202 in the mine premises or further to other consumers.

Patent Document 1: Japanese Patent Application Publication No. 2010-19247

Patent Document 2: U.S. Patent Application Publication No. 2005/0205022

Gas engines that use methane gas as fuel are an internal combustion engine expected to be used widely in future because of their advantage that they cause very little environmental pollution. However, the amount of methane emissions from a coal mine varies largely depending on the time, and therefore how to maintain a stable amount of supply to the gas engine is an issue to be addressed.

The air-fuel mixture ratio, or an excess air ratio, needs to be maintained at an optimal level in order to reduce the concentration of $NO_X$ in the exhaust gas or for other reasons. Maintaining a predetermined excess air ratio, however, is not easy because of the large variations in the amount of methane emissions from a coal mine as mentioned above.

In a gas engine, the temperature of gas mixture supplied to the combustion chamber has to be kept in a constant range of from 40 to 45° C., as otherwise there is a possibility of abnormal combustion such as knock or the like. For this reason, the intake gas having higher pressure and temperature after passing through a turbocharger is kept in a constant temperature range by a charge air cooler (intercooler). With the use of the methane gas emitted from a coal mine, however, it is not easy to control the temperature of the gas mixture supplied to the combustion chamber because of the large variations in the amount of methane gas and performance limitations of the intercooler.

DISCLOSURE OF THE INVENTION

In view of such problems in the conventional techniques, an object of the present invention is to enable a power generating gas engine that uses methane gas as fuel to maintain an optimal excess air ratio to reduce $NO_X$ emissions, and to control to stably keep an optimal excess air ratio even though there are variations in the amount of methane gas.

Another object is to allow optimal control of the temperature of gas mixture supplied to the combustion chamber to prevent abnormal combustion such as knock or the like, and to allow stable temperature control of the gas mixture supplied to the combustion chamber even though there are variations in the amount of methane gas.

To achieve these objects, the gas engine of the present invention includes:

a generator coupled to an output shaft of the engine; an intake passage to which a low-concentration methane gas derived from mine venting is supplied; a gas mixing unit mixing a high-concentration methane gas to the low-concentration methane gas midway of the intake passage, so that a gas mixture of the low-concentration methane gas and the high-concentration methane gas is supplied to and burnt in a combustion chamber;

a turbocharger provided in the intake passage upstream of the gas mixing unit; an air mixing part provided in the intake passage upstream of the turbocharger and mixing air with the low-concentration methane gas; a mixture ratio adjusting unit adjusting a mixture ratio of the low-concentration methane gas and the air in the air mixing part; and an intake controller controlling the mixture ratio adjusting unit to keep the temperature or flow rate of intake gas flowing into the turbocharger in a predetermined range.

The apparatus of the present invention enables use of VAM gas emitted from a coal mine through venting as the low-concentration methane gas, and use of CMM gas emitted from the coal mine as the high-concentration methane gas, whereby emissions of methane, which is a greenhouse gas, from a coal mine to atmosphere can be reduced. The effective use of VAM gas produced through venting allows the consumption of fuel gas of the gas engine to be reduced. Namely, the consumption of the high-concentration methane gas can be reduced.

Applicable examples of the high-concentration methane gas supplied to the gas engine include the CMM gas, natural gas, biogas, by-product gas exhausted from plants and the like, and landfill gas.

The intake controller controls the mixture ratio adjusting unit to adjust the mixture ratio of the low-concentration methane gas and the air so that the temperature or flow rate of intake gas flowing into the turbocharger is kept in a constant range. Thus the excess air ratio can be controlled to be stable by the turbocharger, and the gas mixture temperature can be controlled to be stable by the intercooler provided downstream of the turbocharger. Accordingly, even when there are variations in the amount of methane gas, the excess air ratio and the gas mixture temperature can be controlled to optimal values speedily and precisely, so that combustion can be maintained stable.

The mixture ratio adjusting unit may be formed by flow rate control valves or the like provided in inlet passages of air and VAM gas, for example, so that the mixture ratio of air and VAM gas in the intake passage can be controlled by adjusting the degrees of opening of these valves.

The apparatus of the present invention may further include a bypass passage arranged in parallel with a turbine of the turbocharger that is disposed in an exhaust passage, the bypass passage allowing part of exhaust gas to bypass the turbine; an exhaust gas flow rate control valve controlling flow rate of the exhaust gas in the bypass passage; and a turbocharger controller controlling the exhaust gas flow rate control valve to control operation of the turbocharger, wherein the turbocharger controller controls flow rate of the intake gas passing through the turbocharger such that the gas mixture is supplied to the combustion chamber with a target excess air ratio.

The turbocharger controller controls the flow rate of the intake gas passing through the turbocharger, so as to achieve a target excess air ratio of the gas mixture supplied to the combustion chamber. The intake controller controls the temperature or flow rate, or both the temperature and flow rate, of the intake gas flowing into the turbocharger to be within a constant range in advance. Therefore, even when there are variations in the amount of methane gas, the excess air ratio can be controlled to an optimal value speedily and precisely, through the control of the excess air ratio by the turbocharger and through the temperature control by the intercooler provided downstream of the turbocharger, so that combustion can be maintained stable.

In the apparatus of the present invention, the intake controller may include an intake gas temperature control unit, and the intake gas temperature control unit may control the mixture ratio adjusting unit to adjust the mixture ratio of the low-concentration methane gas and the air to keep the intake gas in the intake passage upstream of the turbocharger in a constant temperature range that allows stable control by the turbocharger controller to achieve the target excess air ratio.

The temperature may be kept in a constant range of 20 to 25° C., for example, for the turbocharger controller to control the excess air ratio to a target value in a stable manner. Thereby, even when there are variations in the amount of methane gas, the temperature of the intake gas flowing into the turbocharger is made stable, so that the turbocharger controller can control the excess air ratio stably, and the intercooler downstream of the turbocharger can control the gas mixture temperature stably. Thus adequate emission performance (such as $NO_X$ emissions, etc) can be achieved, and the engine performance can be fully exploited without the possibility of abnormal combustion such as knock or the like.

In addition to the above configuration, the apparatus may further include a target excess air ratio correcting unit correcting the target excess air ratio, so that the target excess air ratio is changed by the target excess air ratio correcting unit when the intake gas flowing into the turbocharger cannot be controlled to stay in the constant temperature range despite the control of the mixture ratio of the low-concentration methane gas and the air by the intake gas temperature control unit.

Even though the mixture ratio of the low-concentration methane gas and the air is adjusted by the intake controller, the intake gas temperature may sometimes be uncontrollable depending on the temperature of VAM gas or air. When this happens, the target excess air ratio correcting unit corrects the target excess air ratio to a value appropriate for the operation at temperatures outside of the preset range, to allow the gas engine to operate with the corrected target excess air ratio. The target excess air ratio $\lambda$ is corrected from $\lambda=2.0$ to $\lambda=1.9$, for example, with which the gas engine is controllable, so that the gas engine can run stably.

In the apparatus of the present invention, the intake controller may include an intake gas flow rate control unit, and the intake gas flow rate control unit may control the mixture ratio adjusting unit to keep the flow rate of the intake gas upstream of the turbocharger in a constant range that allows stable control by the turbocharger controller to achieve the target excess air ratio.

Thereby, even when there are variations in the amount of methane gas, the amount of the intake gas flowing into the turbocharger is made stable, so that the excess air ratio can be made closer to a target value by the turbocharger controller swiftly and precisely.

In the apparatus of the present invention, the mixture ratio adjusting unit may be controlled such that the low-concentration methane gas is supplied to the air mixing part always with a maximum permissible flow rate.

This allows maximum use of VAM gas as fuel of the gas engine, so that the methane emissions to atmosphere can be minimized. The effective use of VAM gas produced through venting allows the consumption of fuel gas of the engine to be reduced. Namely, the consumption of the high-concentration methane gas can be reduced.

The apparatus of the present invention may be configured to allow part of the high-concentration methane gas to be supplied to the intake passage upstream of the turbocharger and downstream of the air mixing part.

As the high-concentration methane gas is divided and supplied to the intake passage downstream and upstream of the turbocharger, the associated devices such as control valves that form the gas mixing unit midway of the intake passage for mixing the high-concentration methane gas can be divided and arranged at respective positions. The respective devices can be made small and lightweight as they are arranged at separate positions. As the associated devices such as control valves can be made small and lightweight, the problem of installation space can be resolved, and the component cost can be reduced.

The apparatus of the present invention is a gas engine including a generator coupled to an output shaft of the engine, an intake passage to which a low-concentration methane gas derived from mine venting is supplied, and a gas mixing unit mixing a high-concentration methane gas to the low-concentration methane gas midway of the intake passage, so that a gas mixture of the low-concentration methane gas and the high-concentration methane gas is supplied to and burnt in a combustion chamber. The gas engine further includes a turbocharger provided in the intake passage upstream of the gas mixing unit, an air mixing part provided in the intake passage upstream of the turbocharger and mixing air with the low-concentration methane gas, a mixture ratio adjusting unit adjusting a mixture ratio of the low-concentration methane gas and the air in the air mixing part, and an intake controller controlling the mixture ratio adjusting unit to keep the temperature or flow rate of intake gas flowing into the turbocharger in a predetermined range. The apparatus of the present invention enables use of VAM gas derived from mine venting as the low-concentration methane gas, and use of CMM gas emitted from the coal mine as the high-concentration methane gas, whereby emissions of methane, which is a greenhouse gas, from a coal mine to atmosphere can be reduced. The effective use of VAM gas produced through venting allows the consumption of fuel gas of the gas engine to be reduced. Namely, the consumption of the high-concentration methane gas can be reduced.

The intake controller may control the mixture ratio adjusting unit to control the temperature or flow rate of intake gas flowing into the turbocharger by adjusting the mixture ratio of air and VAM gas.

As the temperature or flow rate of intake gas flowing into the turbocharger is controlled in advance to be within a constant range, the excess air ratio can be controlled to be stable by the turbocharger, and the gas mixture temperature can be controlled to be stable by the intercooler provided downstream of the turbocharger. Accordingly, even when there are variations in the amount of methane gas, the excess air ratio and the gas mixture temperature can be controlled to optimal values speedily and precisely, so that combustion can be maintained stable.

BEST MODE FOR CARRYING OUT THE INVENTION

The illustrated embodiments of the present invention will be hereinafter described in detail. It should be noted that, unless otherwise particularly specified, the sizes, materials, shapes, and relative arrangement or the like of constituent components described in these embodiments are not intended to limit the scope of this invention.

Embodiment 1

Figure 1:
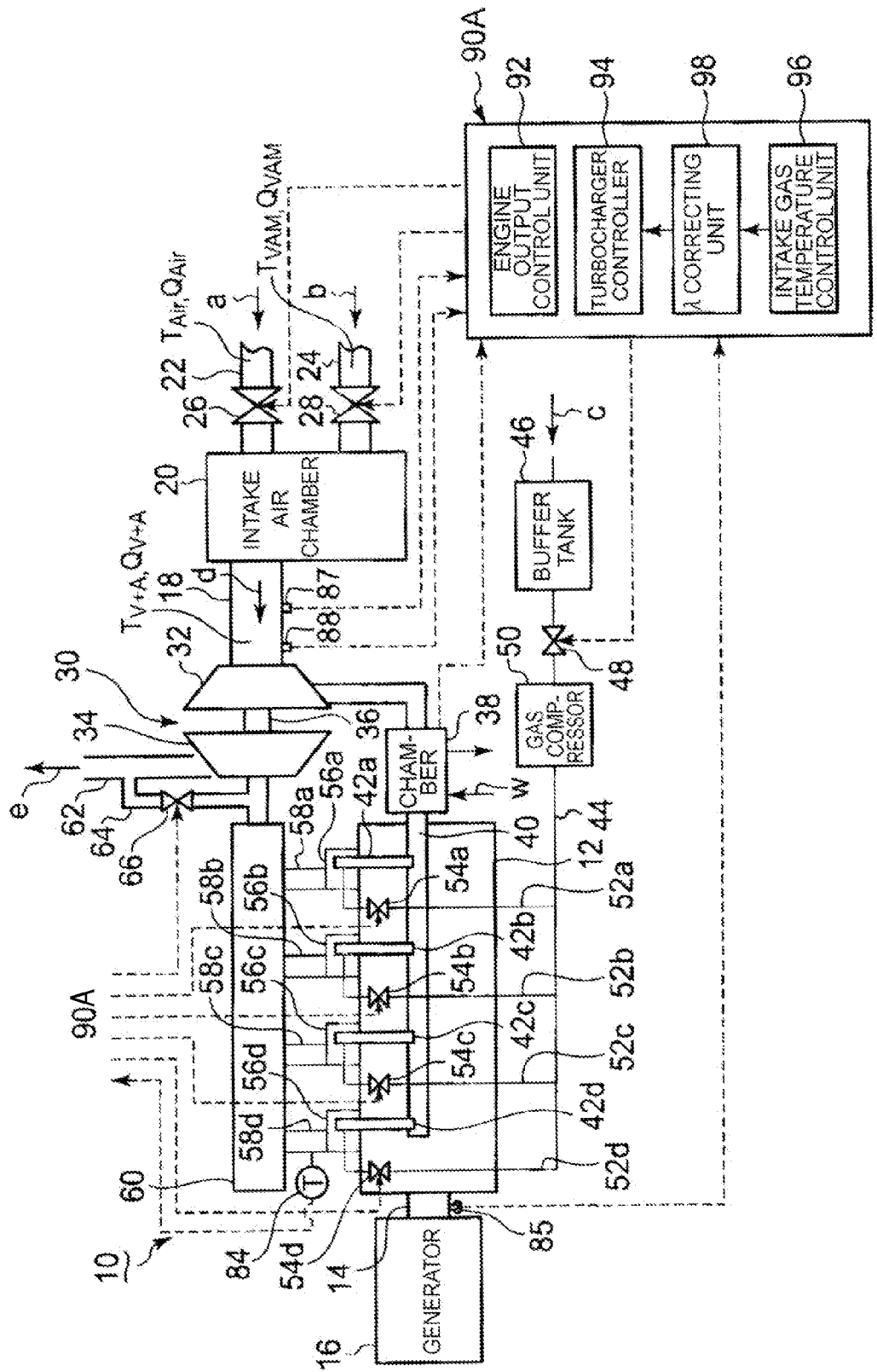
FIG. 1 is a configuration diagram according to a first embodiment of the apparatus of the present invention.
Figure 2:
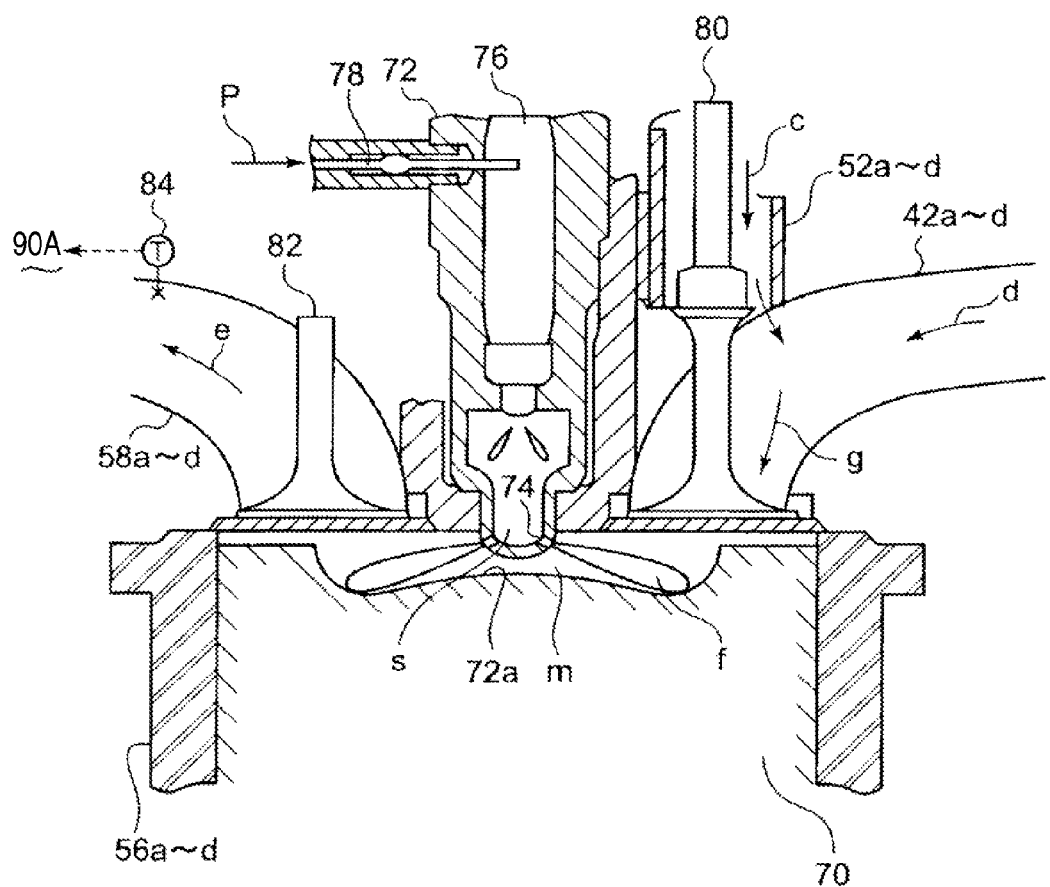
FIG. 2 is a cross-sectional view of a combustion cylinder of the gas engine in the first embodiment.

A first embodiment of the apparatus of the present invention will be described with reference to FIG. 1 to FIG. 3. The power generating gas engine of this embodiment is installed near a coal mine, and uses methane gas emitted from the coal mine as fuel gas and intake gas. In FIG. 1, the power generating gas engine 10 includes an engine body 12 having a plurality of (four in FIG. 1) combustion cylinders, inside which combustion chambers are formed, and a generator 16 coupled to an output shaft 14 of the engine body 12.

An air mixing chamber (air mixing part) 20 is provided upstream of an intake pipe 18 connected to the engine body 12. An air inlet pipe 22 and a VAM gas inlet pipe 24 are connected to the air mixing chamber 20. Air a is introduced into the air inlet pipe 22, while VAM gas b emitted through venting from the coal mine is introduced into the VAM gas inlet pipe 24. VAM gas is a methane-containing gas emitted through venting from the mine tunnels and the coal face of the coal mine, and contains methane with a diluted concentration of less than 1 wt %. The air mixing chamber 20 contains gas/air mixture d, which is a mixture of air a and VAM gas b.

Flow rate control valves 26 and 28 are interposed in the air inlet pipe 22 and VAM gas inlet pipe 24, respectively, their degrees of opening being controlled by an engine controller (intake controller) 90A. The mixture ratio of the gas/air mixture d inside the air mixing chamber 20 is adjusted by controlling the degrees of opening of the flow rate control valves 26 and 28. A compressor 32 of a turbocharger 30 is provided to the intake pipe 18 downstream of the air mixing chamber 20. The compressor 32 is coupled to a turbine 34 provided to an exhaust pipe 62 to be described later via a rotating shaft 36, for compressing the gas/air mixture d to be supplied to the combustion cylinders of the engine body 12.

A charge air cooler (intercooler) 38 is provided downstream of the turbocharger 30. Cooling water w is introduced to this intercooler 38, so that intake gas that has passed through the turbocharger 30 is cooled down by heat exchange with this cooling water w, after which the gas is supplied to the respective combustion cylinders 56a to 56d via a common intake pipe 40 and intake branch pipes 42a to 42d. Temperature control of the intake gas by the intercooler 38 is controlled by the engine controller 90A.

Figure 7:
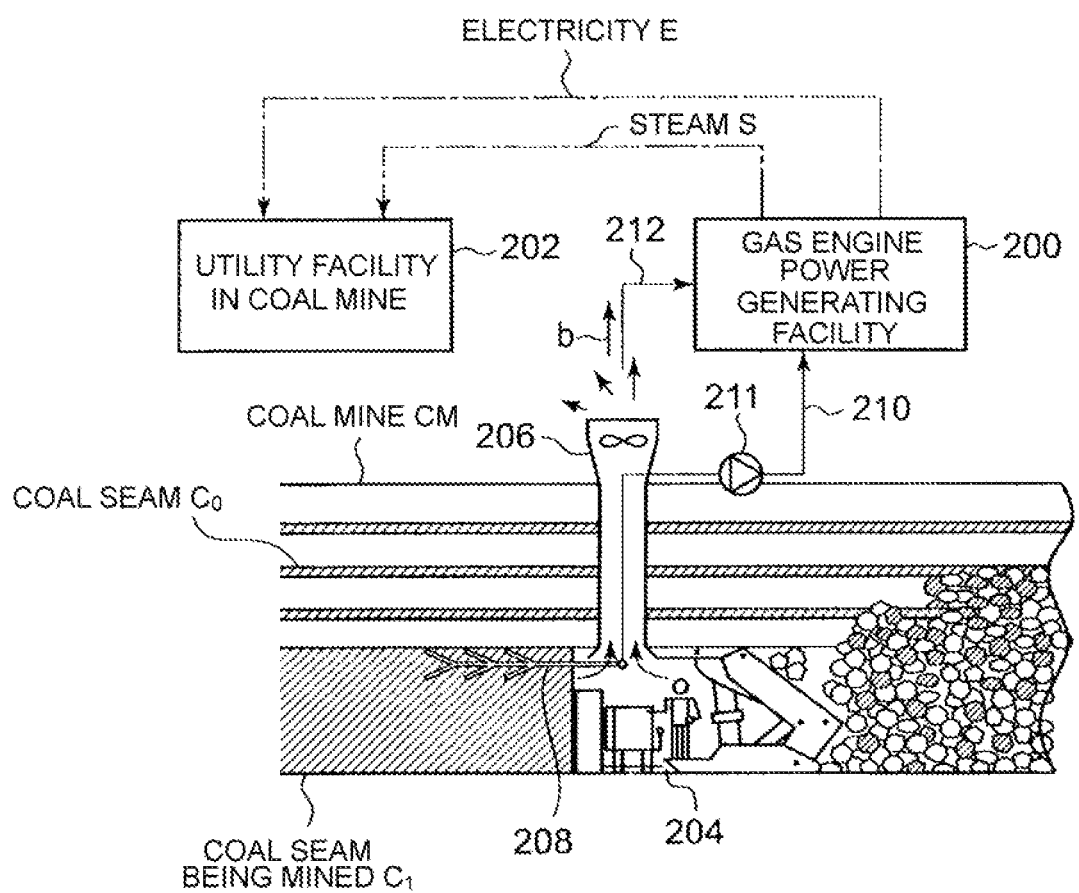
FIG. 7 is a schematic diagram of a gas engine power generating facility built near a coal mine.

Meanwhile, CMM gas c released from the coal mine is supplied to the engine body 12 via a fuel gas supply pipe 44. CMM gas c is a methane-containing gas that exists in coal seams and is recovered from degassing bore holes 208 by a vacuum pump 211 as shown in FIG. 7 for safety reasons, and contains a high concentration of about 20 to 50 wt % of methane. To the fuel gas supply pipe 44 are interposed a buffer tank 46, a flow rate control valve 48, and a gas compressor 50, from the upstream side in this order. The degree of opening of the flow rate control valve 48 is controlled by the engine controller 90A.

The fuel gas supply pipe 44 is divided into four fuel branch pipes 52a to 52d, which are respectively connected to the intake branch pipes 42a to 42d.

CMM gas c sent to the fuel gas supply pipe 44 is compressed by the gas compressor 50, and supplied to the intake branch pipes 42a to 42d via the fuel branch pipes 52a to 52d. The gas/air mixture d and CMM gas c are pre-mixed inside the intake branch pipes, and this gas mixture is supplied to the respective combustion cylinders 56a to 56d as fuel gas g (see FIG. 2). Flow rate control valves 54a to 54d are respectively provided to the fuel branch pipes 52a to 52d, their degrees of opening being controlled by the engine controller 90A. The flow rate control valves 54a to 54d constitute a gas mixing unit that forms connecting parts of the fuel branch pipes 52a to 52d to the intake branch pipes 42a to 42d.

Exhaust branch pipes 58a to 58d are respectively connected to the head parts of the combustion cylinders 56a to 56d. The exhaust branch pipes 58a to 58d are connected to a common exhaust pipe 60, which is further connected to an exhaust pipe 62. The turbine 34 of the turbocharger 30 is provided in the exhaust pipe 62. Exhaust gas e coming out from the respective combustion cylinders 56a to 56d is exhausted through the exhaust branch pipes 58a to 58d, common exhaust pipe 60, and exhaust pipe 62. A bypass pipe 64 bypassing the turbine 34 is connected to the exhaust pipe 62, and a flow rate control valve 66 is interposed in the bypass pipe 64. The degree of opening of the flow rate control valve 66 is controlled by the engine controller 90A.

Next, the structure of the head parts of the combustion cylinders 56a to 56d of the engine body 12 will be described with reference to FIG. 2. In FIG. 2, a piston 70 reciprocates inside each of the combustion cylinders 56a to 56d. A recess 70a is cut in the upper face of the piston 70, and a main combustion chamber m is formed above this recess 70a. An injector case 72 is mounted in the center on the upper face of each of the combustion cylinders 56a to 56d. An injector 76 is mounted inside the injector case 72, and a sub chamber s is formed below the injector 76. A conduit 78 extending through the injector case 72 is connected to the injector 76, so that pilot fuel p is supplied into the injector 76 through the conduit 78.

In the upper face of the combustion cylinder on both sides of the injector case 72 are provided an intake port communicating with a corresponding one of the intake branch pipes 42a to 42d and an exhaust port communicating with a corresponding one of the exhaust branch pipes 58a to 58d. There are provided an intake valve 80 for opening and closing the intake port, and an exhaust valve 82 for opening and closing the exhaust port. An exhaust gas temperature sensor 84 is provided in each of the exhaust branch pipes 58a to 58d for detecting the temperature of the exhaust gas. Measurements by the exhaust gas temperature sensors 84 are sent to the engine controller 90A.

CMM gas c is added to the gas/air mixture d flowing in the intake branch pipes 42a to 42d from the fuel branch pipes 52a to 52d so that they are pre-mixed to form a fuel gas g, which is supplied from the intake ports into the combustion cylinders 56a to 56d. The fuel gas g inside the combustion cylinder is compressed by the piston 70, and the high-pressure, high-temperature gas enters the sub chamber s through injection holes 74 drilled in the bottom of the injector case 72. Meanwhile, pilot fuel p is injected from the injector 76 into the sub chamber s, and ignites the high-pressure, high-temperature fuel gas g. Flames thus generated inside the sub chamber s propagate through the holes 74 drilled in the bottom of the injector case 72 to the main combustion chamber m and the flames f spread in the main combustion chamber m.

The fuel gas g expands inside the main combustion chamber m and pushes down the piston 70 to rotate the output shaft 14. Exhaust gas e produced by combustion is exhausted through the exhaust branch pipes 58a to 58d, common exhaust pipe 60, and exhaust pipe 62.

Referring back to FIG. 1, there are provided an rpm sensor 85 for detecting rotation speed of the output shaft 14, and cylinder pressure sensors (not shown) for detecting pressure inside the main combustion chambers m of the combustion cylinders 56a to 56d, and measurements from all these sensors including the exhaust gas temperature sensors 84 are sent to the engine controller 90A. An engine output control unit 92 controls the output of the gas engine 10 and combustion state in the main combustion chambers m based on the measurements.

There are also provided an intake gas temperature sensor 87 and an intake gas pressure sensor 88 in the intake pipe 18 between the turbocharger 30 and the air mixing chamber 20 for detecting the temperature and pressure of the gas/air mixture d flowing into the compressor 32 of the turbocharger 30. Measurements by these sensors are sent to the engine controller 90A.

In this configuration, a turbocharger controller 94 of the engine controller 90A controls the degree of opening of the flow rate control valve 66 to adjust the flow rate of the exhaust gas flowing through the bypass pipe 64. This controls the flow rate of the exhaust gas flowing through the exhaust pipe 62, which controls the rpm of the turbine of the turbocharger 30, and controls the flow rate of the intake gas flowing through the intake pipe 18.

By thus controlling the flow rate of intake gas flowing into the turbocharger 30, the excess air ratio λ of the gas mixture g fed into the combustion chambers is controlled to a target value.

The excess air ratio λ is determined as follows: First, the concentration of gas/air mixture d is calculated from the measurements of temperature and pressure of the gas/air mixture d by the intake gas temperature sensor 87 and the intake gas pressure sensor 88. Next, the flow rate is calculated from the concentration. The flow rate of CMM gas c flowing through the fuel gas supply pipe 44 is calculated from the degree of opening of the flow rate control valve 48. An approximate value λ' of excess air ratio is obtained from these flow rate of gas/air mixture d and the flow rate of CMM gas c thus calculated. Since the gas/air mixture d includes the VAM gas b and thus contains methane, an accurate value of excess air ratio λ cannot be obtained by the above calculation method. However, since the VAM gas b has an extremely low methane concentration of, typically, less than 1 wt %, the gas/air mixture d inside the intake pipe 18 is regarded as air, and the calculated value λ' is assumed to be λ (λ'≅λ).

In FIG. 1, $T_{Air}$ and $Q_{Air}$ respectively represent the temperature and flow rate of air a introduced from the air inlet pipe 22, $T_{VAM}$ and $Q_{VAM}$ respectively represent the temperature and flow rate of VAM gas b introduced from the VAM gas inlet pipe 24, and $T_{V+A}$ and $Q_{V+A}$ respectively represent the temperature and flow rate of gas/air mixture d flowing into the turbocharger 30. Note, $Q_{V+A}=Q_{Air}+Q_{VAM}$.

While the temperature of VAM gas b emitted from the coal mine is typically from 20 to 25° C. under atmospheric pressure, the temperature of gas/air mixture d flowing through the intake pipe 18 is raised by the compressor 32. The temperature of the fuel gas g supplied into the main combustion chambers m affects the combustion state of the fuel gas g inside the main combustion chambers m. There is a possibility of abnormal combustion such as misfire or knock depending on the temperature of the fuel gas g. The temperature of gas/air mixture d also affects the excess air ratio λ, since the concentration of the gas/air mixture d varies depending on its temperature.

Therefore, the temperature of the fuel gas g supplied into the main combustion chambers m need to be controlled within a predetermined range, typically from 40 to 45° C. While the gas/air mixture d is cooled by the intercooler 38 downstream of the turbocharger 30, the temperature of the gas/air mixture d flowing into the turbocharger 30 needs to be kept in a range of from 20 to 25° C. in consideration of performance limitations of the intercooler 38 and in order to achieve stable control of the excess air ratio. This intake gas temperature control procedure will be explained with reference to FIG. 3.

In this embodiment, the flow rate $Q_{V+A}$ of the gas/air mixture d supplied into the combustion chambers through the compressor 32 of the turbocharger 30 is controlled by the turbocharger controller 94 to a value with which a target excess air ratio $λ_0$ can be achieved. The target excess air ratio $λ_0$ is set to be 2.0, for example, to reduce the $NO_X$ concentration of the exhaust gas e. FIG. 3 is a flowchart showing the procedure of controlling the temperature $T_{V+A}$ of the gas/air mixture d to a preset temperature $T_{SUC}$ ($T_{SUC1}<T_{SUC}<T_{SUC2}$) when the turbocharger 30 is being controlled to achieve this target excess air ratio. $T_{SUC}$ is kept constant in a range of 20° C. to 25° C., for example.

Figure 3:
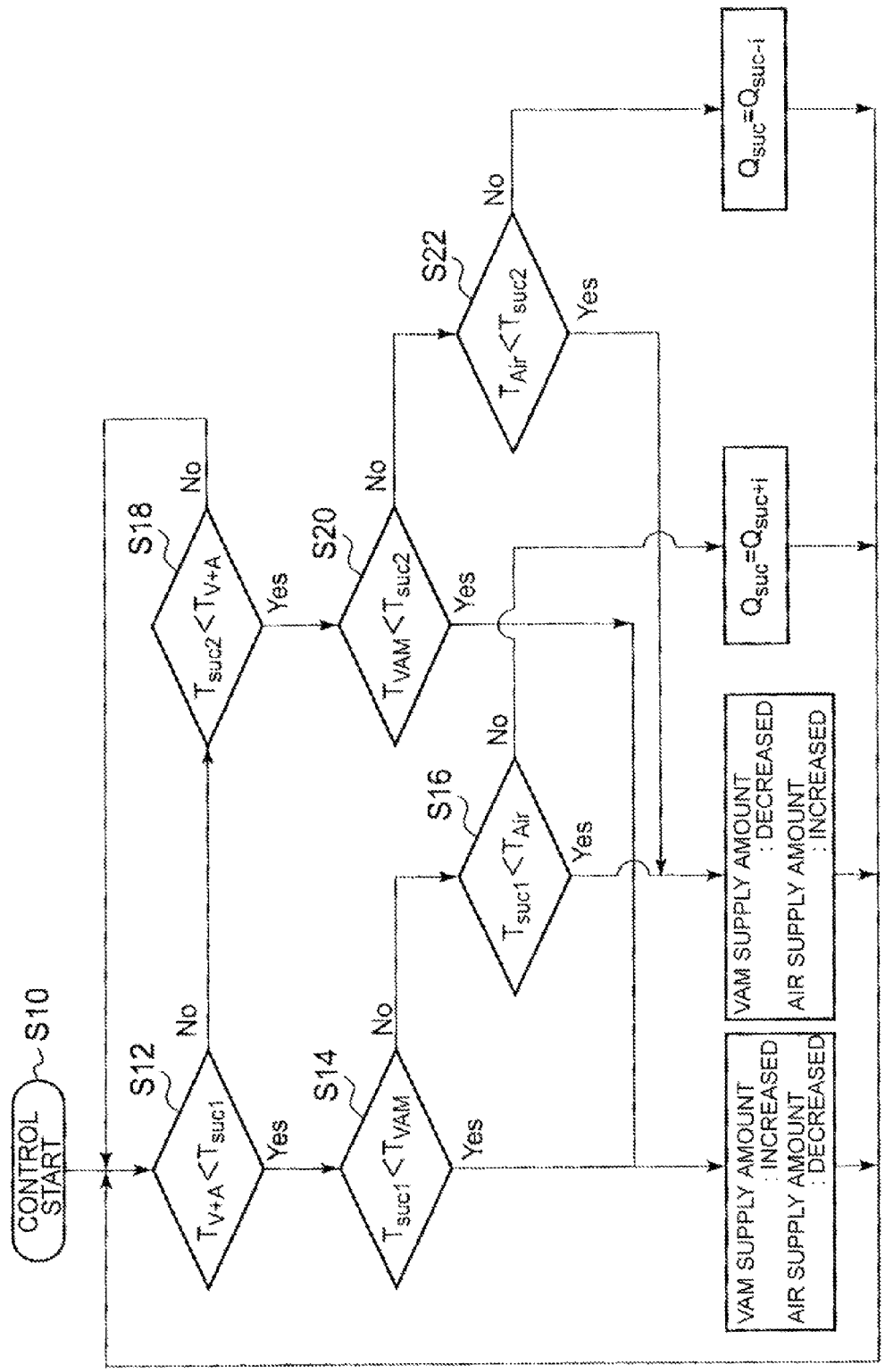
FIG. 3 is a flowchart illustrating the control procedure of the gas engine in the first embodiment.

In FIG. 3, the control starts at step S10, and when $T_{V+A}<T_{SUC1}$ at step S12, the process goes to step S14. When $T_{SUC1}<T_{VAM}$ at step S14, the intake gas temperature control unit 96 controls the degrees of opening of the flow rate control valves 26 and 28 to increase the flow rate of VAM gas $Q_{VAM}$ and to reduce the flow rate of air $Q_{AIR}$. Thereby, the temperature $T_{V+A}$ of gas/air mixture d is raised to fall within the preset temperature range. The flow rate $Q_{V+A}$ of gas/air mixture d, which is the sum of the flow rate of VAM gas $Q_{VAM}$ and the flow rate of air $Q_{Air}$, is not changed.

If not $T_{SUC1}<T_{VAM}$ at step S14, the process goes to step S16. If $T_{SUC1}<T_{Air}$ at step S16, the flow rate of VAM gas $Q_{VAM}$ is reduced and the flow rate of air $Q_{Air}$ is increased. Thereby, the temperature $T_{V+A}$ of gas/air mixture d is raised to fall within the preset temperature range.

If not $T_{SUC1}<T_{Air}$ at step S16, it means that both the VAM gas temperature $T_{VAM}$ and the air temperature $T_{Air}$ are higher than $T_{SUC1}$, so that the controller judges that the temperature of gas/air mixture d cannot be controlled to be within the preset range. An excess air ratio correcting unit 98 corrects the target excess air ratio to a value $\lambda_0'$ appropriate for the operation when the temperature of gas/air mixture d is outside a predetermined range (e.g., $\lambda_0$=2.0+0.1). The preset flow rate $Q_{SUC}$ of gas/air mixture d is changed such as to achieve the corrected target excess air ratio $\lambda_0'$ ($Q_{SUC} \rightarrow Q_{SUC+i}$), and the turbocharger controller 94 controls the degree of opening of the flow rate control valve 66 to achieve the flow rate $Q_{SUC+i}$ of gas/air mixture d.

If not $T_{V+A}<T_{SUC1}$ at step S12, the process goes to step S18. If not $T_{SUC2}<T_{V+A}$ at step S18, it means that the gas/air mixture temperature $T_{V+A}$ is within the preset range, so the process returns to step S12. If $T_{SUC2}<T_{V+A}$ at step S18, the process goes to step S20. If $T_{VAM}<T_{SUC2}$ at step S20, the flow rate $Q_{VAM}$ of VAM gas is increased and the flow rate of air $Q_{Air}$ is reduced. Thereby, the temperature $T_{V+A}$ of gas/air mixture d is lowered to fall within the preset temperature range.

If not $T_{VAM}<T_{SUC2}$ at step S20, the process goes to step S22. If $T_{Air}<T_{SUC2}$ at step S22, the flow rate $Q_{VAM}$ of VAM gas is reduced and the flow rate of air $Q_{Air}$ is increased. Thereby, the temperature $T_{V+A}$ of gas/air mixture d is lowered to fall within the preset range.

If not $T_{Air}<T_{SUC2}$ at step S22, it means that both the VAM gas temperature $T_{VAM}$ and the air temperature $T_{Air}$ are lower than $T_{SUC2}$, so that the controller judges that the temperature of gas/air mixture d cannot be controlled to be within the preset range. The excess air ratio correcting unit 98 corrects the target excess air ratio to a value $\lambda_0''$ appropriate for the operation when the temperature of gas mixture is outside a predetermined range (e.g., $\lambda_0''$=2.0−0.1). The preset flow rate $Q_{SUC}$ of gas/air mixture d is changed such as to achieve the corrected target excess air ratio $\lambda_0''$ ($Q_{SUC} \rightarrow Q_{SUC-i}$), and the turbocharger controller 94 controls the degree of opening of the flow rate control valve 66 to achieve the flow rate $Q_{SUC-1}$ of gas/air mixture d.

In this embodiment, the intake gas temperature control unit 96 controls the temperature $T_{V+A}$ of gas/air mixture d such that the flow rate $Q_{VAM}$ of VAM gas b is always maximum within a permissible range. This is for making the maximum use of VAM gas.

According to this embodiment, VAM gas b emitted from the coal mine is utilized as intake gas of the gas engine 10, while CMM gas c is utilized as fuel gas of the gas engine 10, so that emissions of methane, which is an greenhouse gas, from the coal mine to the atmosphere can be reduced.

The excess air ratio $\lambda$ of fuel gas g supplied to the combustion cylinders 56a to 56d can be controlled to a target value by controlling the flow rate of exhaust gas e bypassing the turbine 34 of the turbocharger 30 by means of the turbocharger controller 94. Therefore, production of $NO_X$ and the like in the exhaust gas e is reduced, as well as the engine performance can be fully exploited without the possibility of abnormal combustion such as knock or the like.

Since the gas/air mixture d of air a and VAM gas b is used as intake gas, the supply of intake gas to the combustion cylinders 56a to 56d can be made stable by adjusting the amount of supply of air in accordance with the amount of supply of VAM gas b. Therefore, the amount of supply of intake gas to the combustion cylinders 56a to 56d can be made stable even though the amount of VAM gas b varies largely.

Furthermore, the intake gas temperature is more easily controllable because it is controlled by introducing air a into the intake gas. Controlling the intake gas temperature before it is fed into the turbocharger 30 to be within the range of from 20 to 25° C. enables stable control of excess air ratio by the turbocharger controller 94 and of intake gas temperature by the intercooler 38 disposed downstream of the turbocharger 30. Thus, even when there are variations in the amount of methane gas, optimal control of the excess air ratio, and of the temperature of the gas mixture supplied to the combustion chambers, is achieved speedily and precisely, to maintain stable combustion.

Even if the temperature of gas/air mixture d cannot be adjusted to be within a preset range despite the adjustment of mixture ratio of air a and VAM gas b in the intake pipe 18, the gas engine can still operate without being hindered, since the excess air ratio correcting unit 98 changes the target excess air ratio to a value appropriate for the operation when the temperature of the gas/air mixture d is outside the predetermined range. While the target excess air ratio $\lambda$, if corrected from 2.0 to 1.9, for example, is more different from the theoretical value, and therefore may adversely affect the $NO_X$ emission control performance, it is set to a value that makes the gas engine controllable, so as to allow the gas engine to run stably.

The mixture ratio of air a and VAM gas b is adjusted such that the flow rate of VAM gas is maximum within a range in which the excess air ratio $\lambda$ can be controlled to a target value and under conditions in which the gas/air mixture d can be kept in a preset temperature range. This allows the emission of VAM gas b to atmosphere to be maximally reduced, as well as maximum use of the energy of methane contained in VAM gas b, so that the consumption rate of CMM gas, which is a high-concentration methane gas, can be reduced.

Embodiment 2

Figure 4:
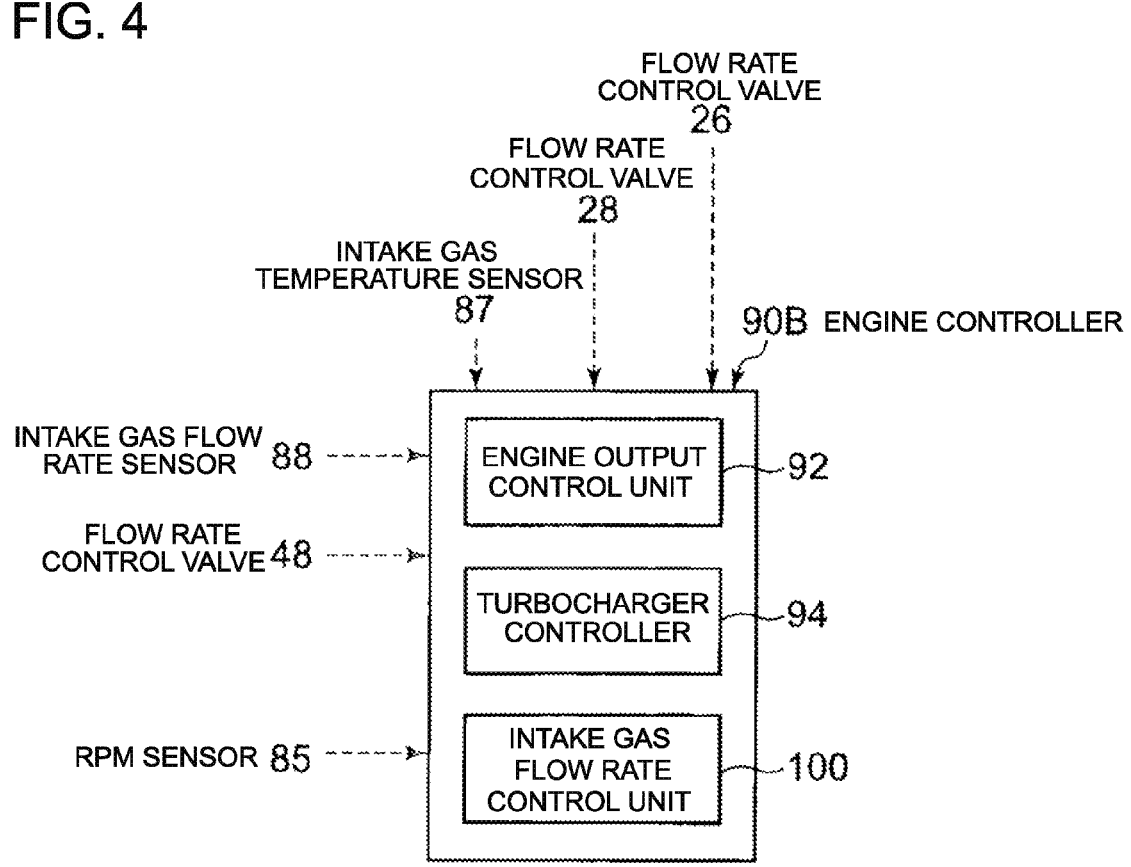
FIG. 4 is a block diagram of an engine controller according to a second embodiment of the apparatus of the present invention.

A second embodiment of the apparatus of the present invention will be described with reference to FIG. 4 and FIG. 5. This embodiment is an example of control of the excess air ratio $\lambda$ to a target value when the temperature of gas/air mixture d is already within the preset range. FIG. 4 illustrates an engine controller 90B of this embodiment. The engine controller 90B includes an intake gas flow rate control unit 100, instead of the intake gas temperature control unit 96 and the excess air ratio $\lambda$ correcting unit 98 of the engine controller 90A, as compared to the engine controller 90A used in the first embodiment. Other features of the structure of the engine controller 90B are the same as the engine controller 90A. The entire configuration other than the engine controller is also the same as the first embodiment.

The intake gas flow rate control unit 100 adjusts the degrees of opening of the flow rate control valves 26 and 28 based on the measurements of the intake gas temperature sensor 87 and the intake gas pressure sensor 88, thereby adjusting the mixture ratio of air a and VAM gas b, so that the flow rate of gas/air mixture d flowing into the turbocharger 30 is adjustable. The procedure for adjusting the flow rate of gas/air mixture d of this embodiment will be described below with reference to FIG. 5.

Figure 5:
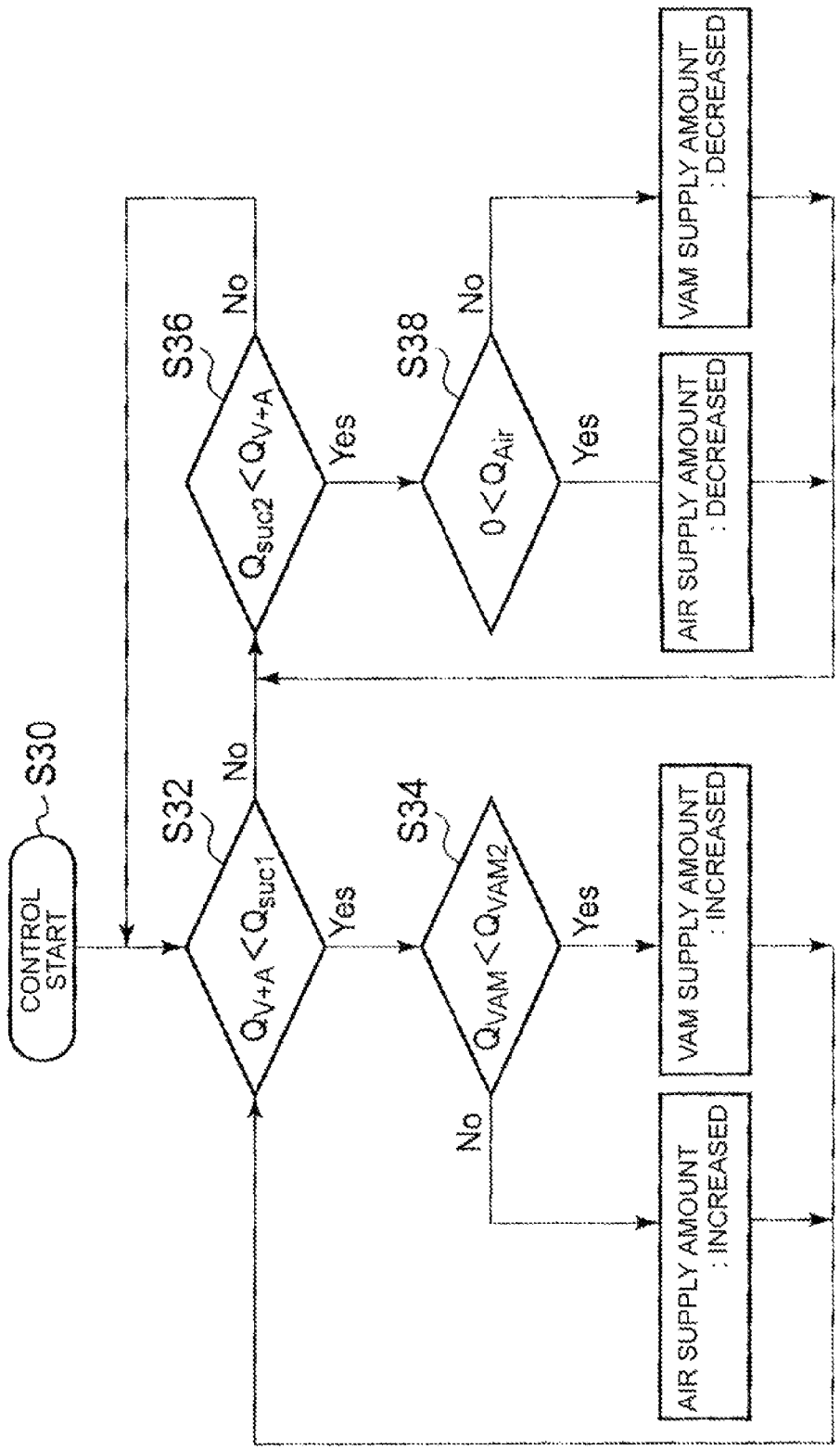
FIG. 5 is a flowchart illustrating the control procedure of the gas engine in the second embodiment.

FIG. 5 is a flowchart for controlling the flow rate $Q_{V+A}$ of gas/air mixture d to fall within a constant range ($Q_{SUC1}<Q_{SUC}<Q_{SUC2}$). Namely, the flowchart illustrates an example of control for maintaining the flow rate $Q_{V+A}$ of gas/air mixture d within a control range with a lower limit of $Q_{SUC1}$ and an upper limit of $Q_{SUC2}$, which is for achieving a preset target excess air ratio λ, as well as for making the flow rate $Q_{VAM}$ of VAM gas b to be maximum available. $Q_{VAM2}$ in the drawing represents a maximum supply limit of VAM gas b.

In FIG. 5, the control starts at step S30. If $Q_{V+A}<Q_{SUC1}$ at step S32, the process goes to step S34. If $Q_{VAM}<Q_{VAM2}$ at step S34, the flow rate of VAM gas b is increased to increase the flow rate of gas/air mixture d to be within the preset range. If not $Q_{VAM}<Q_{VAM2}$, then the flow rate of VAM gas is reduced to not more than $Q_{VAM2}$, while the flow rate of air a is increased to increase the flow rate of gas/air mixture d to fall within the preset range.

If not $Q_{V+A}<Q_{SUC1}$ at step S32, then the process goes to step S36. If not $Q_{SUC2}<Q_{V+A}$ at step S36, it means that the flow rate of the gas/air mixture d is within the preset range, so the process returns to step S32 and the same procedure is repeated.

If $Q_{SUC2}<Q_{V+A}$ at step S36, it means that $Q_{V+A}$ is out of the preset range, so the process goes to step S38. If $0<Q_{Air}$ at step S38, then the flow rate of air a is reduced, so that $Q_{V+A}$ falls within the preset range. If not $0<Q_{Air}$, then the flow rate of VAM gas b is reduced, so that $Q_{V+A}$ falls within the preset range.

The flow rate of gas/air mixture d on the inlet side of the turbocharger 30 is maintained within a preset range in this manner. According to this embodiment, control of gas/air mixture amount on the inlet side of the turbocharger 30 by the intake gas flow rate control unit 100 allows the turbocharger controller 94 to control the excess air ratio speedily and precisely. The excess air ratio can be controlled to remain stable even when there are variations in the amount of methane gas.

Embodiment 3

Figure 6:
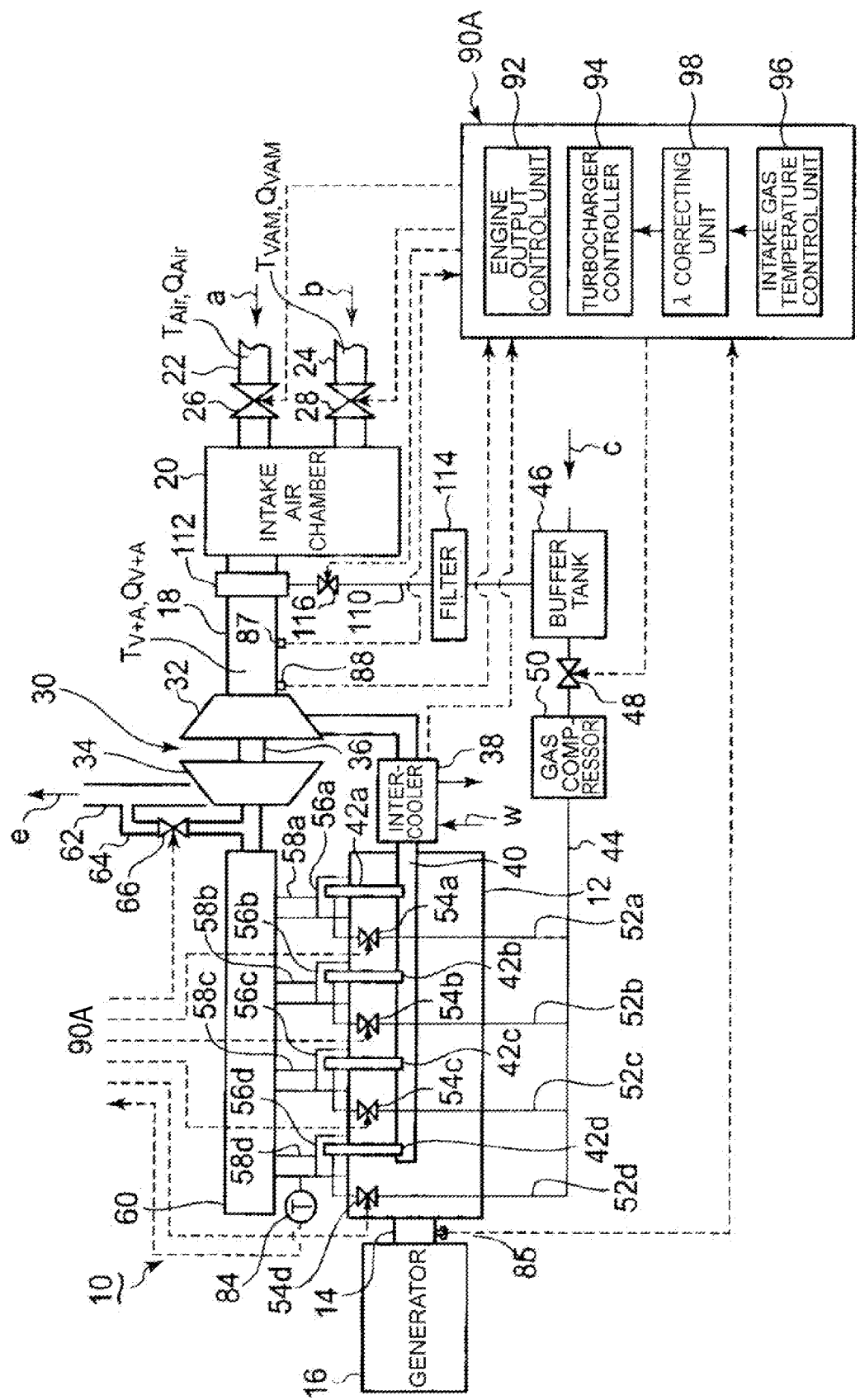
FIG. 6 is a configuration diagram according to a third embodiment of the apparatus of the present invention.

Next, a third embodiment of the apparatus of the present invention will be described with reference to FIG. 6. In FIG. 6, a fuel gas branch pipe 110 is connected to the buffer tank 46, and a gas mixer 112 is provided to the intake pipe 18 between the compressor 32 and the air mixing chamber 20. The fuel gas branch pipe 110 is connected to the gas mixer 112, so that part of CMM gas c is supplied from the gas mixer 112 to the intake pipe 18. A filter 114 and a flow rate control valve 116 are interposed in the fuel gas branch pipe 110. The degree of opening of the flow rate control valve 116 is controlled by the engine controller 90A. Other features of the configuration, including the engine controller 90A, are the same as the previously described first embodiment.

In the third embodiment, the flow rate control valves 54a to 54d and the gas mixer 112 constitute the gas mixing unit.

In this embodiment, control of the excess air ratio and temperature control of the gas/air mixture d are performed by similar operations as in the first embodiment. Part of CMM gas c is supplied to the intake pipe 18 through the fuel gas branch pipe 110.

As part of CMM gas c is supplied to the intake pipe 18 in this embodiment, in addition to the advantages effects of the first embodiment, the flow rate of CMM gas c supplied from the fuel gas supply pipe 44 to the intake branch pipes 42a to 42d is reduced. Therefore, the intake branch pipes 42a to 42d and associated devices such as flow rate control valves 54a to 54d can be made small so that they do not require much installation space, which will lead to an advantage of lower facility cost.

INDUSTRIAL APPLICABILITY

The power generating gas engine of the present invention can reduce greenhouse gas emissions through effective use of methane gas, and ensure stable combustion with an appropriate excess air ratio.

The invention claimed is:

1. A gas engine comprising:
a generator coupled to an output shaft of the engine;
an intake passage to which a low-concentration methane gas derived from mine venting is supplied;
a gas mixing unit including a first flow rate control valve and being configured to mix a high-concentration methane gas to the low-concentration methane gas midway of the intake passage, so that a mixture of the low-concentration methane gas and the high-concentration methane gas is supplied to and burnt in a combustion chamber;
a turbocharger provided in the intake passage upstream of the gas mixing unit;
an air mixing part provided in the intake passage upstream of the turbocharger, the air mixing part being connected to a gas inlet pipe configured to introduce the low-concentration methane gas into the air mixing part and an air inlet pipe configured to introduce air into the air mixing part;
a mixture ratio adjusting unit including a second flow rate control valve provided in the gas inlet pipe so as to control a flow rate of the low-concentration methane gas flowing in the gas inlet pipe and a third flow rate control valve provided in the air inlet pipe so as to control a flow rate of the air flowing in the air inlet pipe;
an intake controller configured to control the mixture ratio adjusting unit to keep a temperature or a flow rate of a gas/air mixture flowing into the turbocharger in a predetermined range;
a bypass passage arranged in parallel with a turbine of the turbocharger that is disposed in an exhaust passage, the bypass passage allowing a part of exhaust gas to bypass the turbine;
a fourth flow rate control valve configured to control a flow rate of the exhaust gas in the bypass passage;
a turbocharger controller configured to control the fourth flow rate control valve to control operation of the turbocharger; and
an intake gas temperature sensor configured to detect a temperature of the gas/air mixture in the intake passage upstream of the turbocharger,
wherein the turbocharger controller is configured to control a flow rate of the gas/air mixture passing through the turbocharger such that the gas/air mixture is supplied to the combustion chamber with a target excess air ratio, and
wherein the intake controller includes an intake gas temperature control unit, the intake gas temperature control unit being configured to control the mixture ratio adjusting unit to adjust a mixture ratio of the gas/air mixture, the intake gas temperature control unit being configured to keep the temperature of the gas/air mixture in the intake passage upstream of the turbocharger detected by the intake gas temperature sensor in a constant temperature range that allows stable control by the turbocharger controller so as to achieve the target excess air ratio.

2. The gas engine according to claim 1, further comprising a target excess air ratio correcting unit correcting the target excess air ratio, so that the target excess air ratio is changed by the target excess air ratio correcting unit when the intake gas flowing into the turbocharger deviates from the constant temperature range and creates abnormal combustion conditions despite the control of the mixture ratio of the low-concentration methane gas and the air.

3. The gas engine according to claim 2, wherein the mixture ratio adjusting unit is controlled such that the low-concentration methane gas is always supplied to the air mixing part at a maximum permissible flow rate.

4. The gas engine according to claim 3, wherein the gas engine is configured to allow a part of the high-concentration methane gas to be supplied to the intake passage upstream of the turbocharger and downstream of the air mixing part so as to maintain stable engine operation.

5. The gas engine according to claim 2, wherein the gas engine is configured to allow a part of the high-concentration methane gas to be supplied to the intake passage upstream of the turbocharger and downstream of the air mixing part so as to maintain stable engine operation.

6. The gas engine according to claim 1, wherein the intake controller includes an intake gas flow rate control unit, and the intake gas flow rate control unit controls the mixture ratio adjusting unit to keep the flow rate of the intake gas upstream of the turbocharger in a constant flow rate range that allows stable control by the turbocharger controller to achieve the target excess air ratio.

7. The gas engine according to claim 6, wherein the mixture ratio adjusting unit is controlled such that the low-concentration methane gas is supplied to the air mixing part always with a maximum permissible flow rate.

8. The gas engine according to claim 7, wherein the gas engine is configured to allow a part of the high-concentration methane gas to be supplied to the intake passage upstream of the turbocharger and downstream of the air mixing part so as to maintain stable engine operation.

9. The gas engine according to claim 6, wherein the gas engine is configured to allow a part of the high-concentration methane gas to be supplied to the intake passage upstream of the turbocharger and downstream of the air mixing part so as to maintain stable engine operation.

10. The gas engine according to claim 1, wherein, when the temperature or flow rate of the gas/air mixture produced in the air mixing part is controlled within a permissible range, the mixture ratio adjusting unit is controlled such that the flow rate of the low-concentration methane gas supplied to the air mixing part is a maximum within the permissible range.

11. The gas engine according to claim 10, wherein the gas engine is configured to allow a part of the high-concentration methane gas to be supplied to the intake passage upstream of the turbocharger and downstream of the air mixing part so as to maintain stable engine operation.

12. The gas engine according to claim 1, wherein the gas engine is configured to allow a part of the high-concentration methane gas to be supplied to the intake passage upstream of the turbocharger and downstream of the air mixing part so as to maintain stable engine operation.

* * * * *